United States Patent [19]

Pratt et al.

[11] Patent Number: 5,216,057
[45] Date of Patent: Jun. 1, 1993

[54] SILICONE MODIFIED ACRYLIC LATEX SEALANT

[75] Inventors: Sandra L. Pratt, Clifton Park; Gary M. Lucas, Scotia, both of N.Y.

[73] Assignee: General Electric Company, Waterford, N.Y.

[21] Appl. No.: 745,962

[22] Filed: Aug. 12, 1991

Related U.S. Application Data

[63] Continuation of Ser. No. 199,565, May 27, 1988, abandoned.

[51] Int. Cl.$^5$ .................................................. C08K 5/54
[52] U.S. Cl. ...................................... 524/269; 524/262; 524/263; 524/265; 524/506
[58] Field of Search .............. 524/269, 265, 506, 262, 524/267

[56] References Cited

U.S. PATENT DOCUMENTS

| | | | |
|---|---|---|---|
| 3,575,910 | 4/1971 | Thomas | 260/29.6 |
| 3,699,067 | 10/1972 | Stockman | 260/29.1 |
| 3,758,306 | 9/1973 | Roos | 96/83 |
| 3,836,598 | 9/1974 | Wheeler | 260/827 |
| 3,905,819 | 9/1975 | Sakurai | 430/309 |
| 4,071,639 | 1/1978 | Palmer et al. | 524/269 |
| 4,340,524 | 7/1982 | Bullman | 524/297 |
| 4,478,990 | 10/1984 | Kohno et al. | 526/279 |
| 4,486,565 | 12/1984 | Benjamin | 524/506 |
| 4,491,650 | 1/1985 | Rizk et al. | 525/102 |
| 4,496,611 | 1/1985 | Kawakubo et al. | 427/160 |
| 4,567,107 | 1/1986 | Rizk et al. | 428/425.5 |
| 4,626,567 | 12/1986 | Chang | 524/493 |
| 4,791,163 | 12/1988 | Traver et al. | 524/506 |

FOREIGN PATENT DOCUMENTS 2355813 6/1975 Fed. Rep. of Germany ...... 524/506

*Primary Examiner*—Ralph H. Dean, Jr.

[57] ABSTRACT

The wet soak adhesion of acrylic latex sealants is improved by incorporating micelles of polysiloxane oil into the emulsion.

6 Claims, No Drawings

SILICONE MODIFIED ACRYLIC LATEX SEALANT

This application is a continuation of application Ser. No. 07/199,565, filed May 27, 1988, now abandoned.

The present invention relates to acrylic latex sealants. More particularly, the present invention relates to acrylic latex sealants modified with polysiloxane oil.

BACKGROUND OF THE INVENTION

Acrylic latex sealants are characterized by many desirable properties including high strength, high Shore A hardness, good flexibility and good dry adhesion to many substrates. However, they have one major weakness—poor wet adhesion. If the acrylic latex sealant is immersed in water for continuous periods of time, i.e. 24 hours or longer, total loss of adhesion can occur.

Water resistant acrylic latex sealants have been described by Bullman, in U.S. Pat. No 4,340,524, Chang, in U.S. Pat. No. 4,626,567, Roos, in U.S. Pat. No. 3,758,306, and Benjamin, in U.S. Pat. No. 4,486,565, in which acrylic latex resins are blended with aqueous emulsions of hydrolyzed organosilanes such as gamma-aminopropyltrimethoxysilane at levels of 0.1 to 1.0% by weight silane. Chang, in U.S. Pat. No. 4,626,567, also discloses use of 0.5% fumed silica as a hydrophobic agent in an acrylic latex caulk.

Thomas, in U.S. Pat. No. 3,575,910, describes silicone-acrylate copolymer aqueous emulsions for coatings with improved weatherability. Other silicone-acrylate polymer compositions characterized by improved moisture resistance are disclosed by Wheeler, in U.S. Pat. No. 3,836,598, Hattori, in U.S. Pat. No. 4,478,990, Riek, et al., in U.S. Pat. Nos. 4,491,650 and 4,567,107, and Kama Kuho, in U.S. Pat. No. 4,496,611.

Stockman, in U.S. Pat. No. 3,699,067, discloses use of low levels of trimethylsilyl stopped polydimethylsiloxane oil used to plasticize an acrylic terpolymer. The acrylic terpolymer with siloxane oil is dissolved in ethanol (25% solids solution) and used as a protective coating with antiadhesion, i.e. "release", characteristics.

The object of this invention is to provide acrylic latex based sealent compositions which will withstand immersion in water for prolonged periods without loss of adhesion. It is another object of the present invention to modify acrylic latex based sealant by addition of a polysiloxane to improve properties. Still further objects of the invention will become apparent from the following description.

SUMMARY OF THE INVENTION

Briefly, there is provided by the present invention an acrylic latex sealant composition comprising at about 10 to 80% by weight solids of (a), (b) and (c) in water emulsion:
(a) 100 parts by weight micelles of acrylic polymer,
(b) from about 0.1 to about 30 parts by weight micelles of polysiloxane oil, and
(c) at least one effective surfactant to stabilize said emulsion. There is also provided a method for making the sealant.

The acrylic polymer may suitably be a polymer of an alkyl acrylate or methacrylate or a copolymer of the same copolymerized with at least one ethylenically unsaturated comonomer. Generally the alkyl acrylate or methacrylate will be the predominant component of the ccpolymer, with the comonomer being present in minor amounts. As is known, one or more alkyl acrylates or methacrylates may be used to form the copolymer. Useful comonomers include acrylic acid, methacrylic acid, itaconic acid or N-methyl acrylamide or a mixture of two or more thereof and the like. Copolymers of monomers, such as acrylonitrile, that impart an undesired yellowing to the sealant are not useful in a clear sealant but may be useful in a colored sealant. Preferably the alkyl acrylate or methacrylate will comprise from about 1 to about 8 carbon atoms in the alkyl moiety such as ethylacrylate, hexyl acrylate, butyl acrylate and the like. These copolymers and their use in sealants are well known to the art.

The polysiloxane oil for use herein may be represented by the formula:

$$R \!+\! R_2SiO_{2/2} \!\!\frac{}{n} SiR_3$$

where R is a substituted or unsubstituted hydrocarbon radical of from 1 to about 15 carbon atoms and n is 1 to about 100,000. Specifically R may be independently alkyl of 1 to 6 carbon atoms, such as methyl, ethyl, butyl, hexyl, etc.; aryl of 6 to 12 carbon atoms, such as phenyl, naphthyl, tolyl, benzyl, etc.; haloalkyl or haloaryl such as 3,3,3-trifluoropropyl, etc.; alkenyl such as allyl, vinyl, etc.; alkoxy; acyloxy; amino; aminoxy; etc. Preferably R is at least about 70% by number methyl and n is from about 5 to about 10,000. It is most preferred that the polysiloxane oil have an n and R selected to provide for a viscosity of about 100 to about 1000 centipoise at 25° C.

Surfactants are useful and necessary herein to stabilize the micelles of acrylic polymer and the micelles of polysiloxane oil. Stabilizing the micelles may be accomplished with more than one surfactant as in the case where a first surfactant is utilized to stabiilze the micelles of acrylic copolymer and a second surfactant is utilized to stabilize micelles of polysiloxane oil. Alternatively, a single surfactant will in some instances serve to stabilize both types of micelles. Suitable surfactants include anionic, non-ionic, cationic or amphoteric surfactants, but preferably a non-ionic surfactant is employed. Generally the amount of surfactant employed will range from about 0.1 to about 5% by weight, based on the total weight of the sealant composition.

Suitable non-ionic surfactants include polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. Useful anionic surfactants include those obtained by alkylating aromatic nuclei, suflonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

The water emulsion herein containing its diverse micelles may be conveniently manufactured. Conventional methods may be employed to produce separate water emulsions of polysiloxane oil and acrylic polymer. In the case of the acrylic polymer, emulsion polymerization can be employed to produce micelles of polymer from the beginning. Micelle sizes are those that ordinarily result from this type of polymerization and solids content might range from 10% to 80% by weight polymer solids with about 45% to 65% by weight polymer solids preferred. In the case of polysiloxane oil, mechanical means are generally employed to produce the emulsion. Micelle sizes might range from about 50 to about 1,000 nanometers with smaller micelle sizes preferred but practically the sizes will range from 200 to 400 nanometers. Solids content might range again from 10 to 80% by weight polysiloxane solids with about 40% to 60% by weight solids preferred.

The separate emulsions are subsequently mixed to produce a single sealant composition. Preferably, the sealant composition contains 30 to 70% by weight solids of acrylic polymer, polysiloxane oil and surfactant in water emulsion. Mixing may be performed in conventional batch mixers or continuous extruders. Of course, since water emulsions are being mixed as opposed to polysiloxane oil and acrylic polymer, mixing is easily accomplished.

Various additives may be mixed with one or the other separate emulsions as is most appropriate or additives may be mixed with the blended sealant composition. It is clear that any additive employed must not act to destabilize the emulsion of polysiloxane oil or acrylic polymer and further must itself be stable as an emulsion or dispersion. Thus, any additive may require further surfactants and may be blended straight or as a separate preformed emulsion or dispersion.

The list of additives which may be optionally employed is extensive. Fillers may be employed to extend and strengthen the sealant composition in amounts ranging from 1 to 80% by weight and preferably 45 to 55% by weight of the composition. Fillers commonly employed include inorganic fillers such as calcium carbonate, calcium oxide and magnesium carbonate and organic fillers such as lignin, proteinaceous materials, synthetic fibers and cellulosic materials. Pigments and pigment dispersants may be employed for obvious purposes, generally in amounts of each ranging from 0.01 to 10% by weight of the sealant composition. Emulsified organosilane coupling agents may be employed to improve bonding in amounts generally ranging from 0.01 to 5% by weight of the sealant composition. Suitable coupling agents include amino and epoxy alkoxysilanes. Aqueous base pH adjustors such as ammonium hydroxide may be employed to improve stability in amounts typically from 0.05 to 0.5% by weight of the sealant composition. High boiling organic solvents such as mineral spirits may be employed to retard caulk skin-over time in amounts of from 0.1 to 10% by weight of the sealant composition. Freeze-thaw stabilizers such as ethylene and propylene glycol may be employed to maintain emulsion stability with severe cold in amounts ranging from about 0.5 to about 5% by weight of the sealant composition. From about 0.05 to about 1% by weight of the sealant composition might be a thixotrope such as hydroxyethylcellulose. Organic plasticizers may be used in amounts ranging from 1 to 20% by weight of the sealant composition not only to control modulus but also to control glass transition temperature. Suitable organic plasticizers include dibasic esters such as dibutyl phthalate, butyl benzyl phthalate, dioctyl phthalate, and dioctyl sebacate; monobasic acid esters such as diethylene glycol dibenzoate, triethylene glycol dibenzoate, dipropylene glycol dibenzoate and organic solvents of the glycol ether ester variety such as diethylene glycol monoalkyl ether and buryl cellosolve acetate. Further, biocides such as 5-chloro-2-methyl-4-isothiazolin-3-one, 2-n-octyl-4-isothiazolin-3-one and 2-methyl-4-isothiazoline-3-one are generally employed in water emulsion products.

The following examples are offered by way of illustration and not by way of limitation. All parts are in parts by weight.

The following Table 1 lists materials employed herein.

TABLE 1

| Materials | Description |
| --- | --- |
| Acrylic Latex | Rhoplex ® 1785 latex, Rohm & Haas, 55% solids |
| Polysiloxane Oil Emulsion | 50 parts 350 centipoise methyl-stopped polydimethylsiloxane, 4 parts Triton ® X-405 surfactant, 50 parts water, 300 nanometer average micelle diameter |
| Filler | $CaCO_3$ |
| Plasticizer | Santicizer ® 160, butylbenzylphthalate, Monsanto |
| Freeze-Thaw Stabilizer* | Ethylene glycol |
| Surfactant | Triton ® X-405, octylphenoxy-polyethoxyethanol, 70% aqueous solution, Rohm & Haas |
| Dispersant A | Tamol ® 850, acrylic polymer, 30% aqueous emulsion, Rohm & Haas |
| Dispersant B | Potassium tripolyphosphate |
| Surface Skin Retarder** | Mineral spirits |
| Pigment | $TiO_2$ |
| pH Adjustor | $NH_4OH$, 28% aqueous solution |
| Thixatrope | Hydroxyethylcellulose |
| Coupling Agent | Glycidoxypropyltrimethoxysilane |

*Freeze-Thaw Stabilizer (FTS)
**Surface Skin Retarder (SSR)

EXAMPLE 1

A conventional acrylic latex sealant is prepared from the following materials using the procedure described below.

| Material | Parts |
| --- | --- |
| Acrylic Latex | 38.6 |
| Polysiloxane Oil Emulsion | 0.0 |
| Filler | 52.6 |
| Plasticizer | 5.0 |
| FTS | 0.95 |
| Surfactant | 0.80 |
| Dispersant A | 0.10 |
| Dispersant B | 0.10 |
| SSR | 0.80 |
| Pigment | 0.80 |
| pH Adjustor | 0.20 |
| Thixatrope | 0.0 |
| Coupling Agent | 0.05 |

The sealant composition was prepared by first charging the acrylic latex to a mixer equipped with a water cooled jacket and vacuum port. A pre-blend of surfactant and Dispersant A was prepared and charged to the mixer and mixed 5 minutes. Ethylene glycol was charged to the mixer and mixed 5 minutes. Plasticizer was charged to the mixer and mixed 5 minutes. A Dispersant B and pigment blend was prepared and charged to the mixer and contents mixed 5 minutes. pH adjustor was charged to the mixer and mixed 15 minutes. Filler was charged using three equal additions, mixing 10 minutes between additions. A one hour mix followed the final filler addition. Temperature of mix did not exceed 40° C.

The final step was to deair the batch accomplished via a 10 minute mix under 20 inches vacuum. The final composition was a white, creamy, smooth, thixatropic paste with pH 7.80 and specific gravity 1.560.

EXAMPLE 2

The acrylic latex sealant, described in Example 1, was tested for primerless adhesion characteristics (180° peel mode) in accordance with ASTM C-794. The drying conditions used for all were 7 days at 77° F. and 50% RH followed by 7 days at 122° F. Peel specimens were prepared in duplicate, half of which were tested to failure after the 7 day 122° F. storage, with the other half undergoing an additional 7 day water soak prior to testing. The aluminum, glass, ceramic tile and PVC substrates were solvent cleaned with isopropanol and air dried. The mortar substrates were wiped with a damp cloth and air dried. The reported figures are lb/in at failure/% cohesive failure to the substrate.

| Substrates | Dry* | Wet** |
| --- | --- | --- |
| Glass | 15/10 | 5/0 |
| Mortar | 38/80 | 10/20 |
| Ceramic Tile | 18/0 | 0/0 |
| Anodized Alum | 20/10 | 17/0 |
| PVC | 13/0 | 12/0 |

*7 day 77° F., 7 day 122° F.
**7 day 77° F., 7 day 122° F.
7 day water soak at 77° F.

EXAMPLE 3

A modified acrylic latex sealant was prepared from the following materials using the procedure described in Example 1.

| Material | Parts |
| --- | --- |
| Acrylic Latex | 37 |
| Polysiloxane Oil Emulsion | 4.1 |
| Filler | 50 |
| Plasticizer | 5.1 |
| FTS | 0.95 |
| Surfactant | 0.80 |
| Dispersant A | 0.10 |
| Dispersant B | 0.10 |
| SSR | 0.80 |
| Pigment | 0.80 |
| pH Adjustor | 0.20 |
| Thixatrope | 0.0 |
| Coupling Agent | 0.05 |

The polysiloxane oil emulsion was added after the one hour filler dispersion mix and mixed for 20 minutes with the last 10 minutes under deairing vacuum. The final composition was a white, creamy, smooth, thixatropic paste with pH 7.70 and specific gravity 1.556.

EXAMPLE 4

Wet and dry peel adhesion of the sealant of Example 3 was measured as described in Example 2 with the following results.

| Substrates | Dry | Wet |
| --- | --- | --- |
| Glass | 22/0 | 21/100 |
| Mortar | 15/10 | 11/0 |
| Ceramic Tile | 15/0 | 33/100 |
| Anodized Alum | 22/0 | 29/100 |
| PVC | 11/0 | 21/100 |

EXAMPLE 5

| Material | Parts |
| --- | --- |
| Acrylic Latex | 36.8 |
| Polysiloxane Oil Emulsion | 4.1 |
| Filler | 51.1 |
| Plasticizer | 5.1 |
| FTS | 0.95 |
| Surfactant | 0.80 |
| Dispersant A | 0.10 |
| Dispersant B | 0.10 |
| SSR | 0.80 |
| Pigment | 0.80 |
| pH Adjustor | 0.15 |
| Thixatrope | 0.15 |
| Coupling Agent | 0.05 |

The thixatrope was added as a preblend with the surfactant. Sealant mixing was the same as that described in Example 3. The final composition was a white, creamy, smooth thixatropic paste of pH 7.51 and specific gravity 1.553.

EXAMPLE 6

Peel adhesion values for the sealant of Example 5 were determined using the method described in Example 2.

| Substrates | Dry | Wet |
| --- | --- | --- |
| Glass | 19/0 | 28/100 |
| Mortar | 30/75 | 24/100 |
| Ceramic Tile | 19/0 | 26/100 |
| Anodized Alum | 35/100 | 30/100 |
| PVC | 9/0 | 30/100 |

What is claimed is:

1. A method for improving the water soak adhesion of acrylic latex sealant compositions comprising the steps of mixing
   (a) 100 parts of an acrylic latex sealant composition and
   (b) a water emulsion of from about 0.1 to about 30 parts by weight micelles of polysiloxane oil at 10 to 80% by weight polysiloxane oil solids, to a white paste sufficiently to produce a single sealant composition in which the micelles of polysiloxane oil are dispersed throughout the sealant.

2. The method of clam 1 wherein the acrylic latex sealant composition comprises an acrylic polymer comprising an alkyl acrylate or alkyl methacrylate polymer or a copolymer of said alkyl acrylate or alkyl methacrylate polymer copolymerized with at least one ethylenically unsaturated comonomer.

3. The method of claim 1 wherein said polysiloxane oil is represented by the formula:

wherein R is a substituted or unsubstituted hydrocarbon radical of from 1 to about 15 carbon atoms and n is 1 to about 100,000.

4. The method of claim 3 wherein n is 5 to about 10,000.

5. The method of claim 1 wherein said polysiloxane oil has a viscosity between about 100 and about 1000 centipoise at 25° C.

6. The method of claim 2 where R is methyl.